(12) United States Patent
Fan et al.

(10) Patent No.: US 9,619,244 B2
(45) Date of Patent: Apr. 11, 2017

(54) METHOD AND SYSTEM FOR UPGRADING AN ELECTRONIC DEVICE

(71) Applicant: Xiaomi Inc., Beijing (CN)

(72) Inventors: Jialin Fan, Beijing (CN); Heng Qu, Beijing (CN); Pengfei Zhang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/740,667

(22) Filed: Jun. 16, 2015

(65) Prior Publication Data

US 2016/0070578 A1    Mar. 10, 2016

Related U.S. Application Data

(63) Continuation-in-part of application No. PCT/CN2015/074441, filed on Mar. 18, 2015.

(30) Foreign Application Priority Data

Sep. 5, 2014    (CN) .......................... 2014 1 0452434

(51) Int. Cl.
*G06F 9/455*    (2006.01)
*G06F 9/44*    (2006.01)
*G06F 9/445*    (2006.01)

(52) U.S. Cl.
CPC .............. *G06F 9/4411* (2013.01); *G06F 8/67* (2013.01); *G06F 8/68* (2013.01); *G06F 9/4406* (2013.01);
(Continued)

(58) Field of Classification Search
CPC .......... G06F 8/67; G06F 9/455; G06F 9/4406; G06F 9/4411
See application file for complete search history.

(56) References Cited

U.S. PATENT DOCUMENTS

| 2004/0215755 A1* | 10/2004 | O'Neill | ..................... G06F 8/65 709/223 |
| 2005/0154787 A1* | 7/2005 | Cochran | ............... G06F 9/4411 709/219 |

(Continued)

FOREIGN PATENT DOCUMENTS

| CN | 101465757 A | 6/2009 |
| CN | 102289382 A | 12/2011 |

(Continued)

OTHER PUBLICATIONS

Extended European Search Report dated Feb. 9, 2016 for European Application No. 15182100.6, 10 pages.
(Continued)

*Primary Examiner* — Charles E Anya
(74) *Attorney, Agent, or Firm* — Brinks, Gilson & Lione

(57) ABSTRACT

The present disclosure relates to methods and systems for upgrading electronic devices. For example, described herein are ways to upgrade components of an electronic device. The techniques may include receiving, at an electronic device (such as a smart phone or tablet computer), a plurality of files for upgrading a component of the electronic device. The electronic device may select a file of the plurality of files that is indicative of being configured to upgrade the component to a next version of a chronological sequence of versions of the component. The electronic device may also upgrade the component using the selected upgrade file. Also, the electronic device may repeat automatically, without human intervention, the selecting and the upgrading until the component is upgraded to a target version of the sequence of the versions.

19 Claims, 3 Drawing Sheets

(52) U.S. Cl.
CPC ...... *G06F 9/44505* (2013.01); *G06F 9/44536* (2013.01); *G06F 9/455* (2013.01)

(56) References Cited

U.S. PATENT DOCUMENTS

| | | | | |
|---|---|---|---|---|
| 2006/0047942 | A1* | 3/2006 | Rothman | G06F 8/61 713/2 |
| 2006/0161914 | A1* | 7/2006 | Morrison | G06F 8/68 717/174 |
| 2008/0288935 | A1* | 11/2008 | Kawaguchi | G06F 8/65 717/172 |
| 2012/0081751 | A1* | 4/2012 | Choi | G06F 3/1204 358/1.15 |
| 2012/0144379 | A1 | 6/2012 | Tsai | |
| 2012/0198438 | A1* | 8/2012 | Auer | G06F 8/61 717/176 |
| 2014/0033193 | A1* | 1/2014 | Palaniappan | G06F 8/65 717/173 |
| 2014/0173578 | A1* | 6/2014 | Ku | G06F 8/65 717/169 |
| 2014/0351807 | A1* | 11/2014 | Wen | H04L 67/02 717/173 |

FOREIGN PATENT DOCUMENTS

| | | |
|---|---|---|
| CN | 102360298 A | 2/2012 |
| CN | 102650947 A | 8/2012 |
| CN | 103336699 A | 10/2013 |
| CN | 103841155 A | 6/2014 |
| CN | 104301383 A | 1/2015 |
| JP | H11-219284 A | 8/1999 |
| JP | 2002-099418 A | 4/2002 |
| JP | 2003-256212 A | 9/2003 |
| JP | 2003-330719 A | 11/2003 |
| JP | 2004-194298 A | 7/2004 |
| JP | 2007-523395 A | 8/2007 |
| JP | 2010-140220 A | 6/2010 |
| JP | 2011-170466 A | 9/2011 |
| JP | 2012-084118 A | 4/2012 |
| KR | 10-2001-0035347 A | 5/2001 |
| KR | 10-2007-0002849 A | 1/2007 |
| RU | 2005 101 832 A | 7/2006 |

OTHER PUBLICATIONS

International Search Report dated Jun. 30, 2015 for International Application No. PCT/CN2015/074441, 2 pages.
Office Action dated Feb. 18, 2016 for Korean Application No. 10-2015-7012811, 8 pages.
Office Action dated Sep. 27, 2016 for Japanese Application No. 2016-546137, 5 pages.
Office Action dated Aug. 30, 2016 for Korean Application No. 10-2015-7012811, 6 pages.
Office Action dated Aug. 17, 2016 for Russian Application No. 2015121621/08, 13 pages.

* cited by examiner

METHOD AND SYSTEM FOR UPGRADING AN ELECTRONIC DEVICE

CROSS-REFERENCE TO RELATED APPLICATIONS

This application is a continuation-in-part of International Application No. PCT/CN2015/074441 with an international filing date of Mar. 18, 2015, which is based upon and claims priority to Chinese Patent Application No. 201410452434.5, filed Sep. 5, 2014, the entire contents of which are incorporated herein by reference.

TECHNICAL FIELD

The present disclosure relates to methods and systems for upgrading an electronic device, such as a smart device, mobile phone, personal computer, modem, router, or any other type of electronic device capable of receiving communications over a network and upgrading according to at least such communications.

BACKGROUND

Electronic devices, such as a smart devices, mobile phones, personal computers, modems, and routers, have become central in life and work of people. Such devices may include various hardware, software, and firmware components that are upgradable to keep up with the pace of modern life and industry. For example, such devices may include operating systems that are upgradable to keep up with developments in information technology.

Upgradable components can allow serviced providers and device manufacturers to gradually launch component upgrades, which can provide new versions of components and enhancements without much risk in breaking related systems. However, because of the nature of development for some upgradable components and because upgrades from over a network are relatively new, technical problems may arise (such as compatibility issues in upgrading between versions). Therefore, there are many technical solutions for many technical problems in component upgrading yet to be invented.

SUMMARY

Described herein are methods and systems for upgrading an electronic device, such as a smart device, mobile phone, personal computer, modem, router, or any other type of electronic device capable of receiving communications over a network and upgrading according to at least such communications. The methods and systems provide technical solutions for various technical problems that may arise in the upgrading of electronic devices.

In an example, a local system of an electronic device can detect automatically, without human intervention, an available upgrade for a component of the electronic device according to a corresponding indication broadcasted by a component upgrade system. This local system can also receive (such as at data processing circuitry via communication circuitry) a plurality of files for upgrading the component of the electronic device (such as a software, hardware, or firmware component), based on the detection. For example, circuitry may receive the set of files to upgrade an upgradable circuit of the electronic device. Also, the system may include circuitry, configured to: select a file of the plurality of files that is indicative of being configured to upgrade the component to a next version of a chronological sequence of versions of the component; upgrade the component using the selected file; and repeat automatically, without human intervention, the selecting and the upgrading until the component is upgraded to a target version of the sequence of the versions. In an example, the repeating of the selecting and the upgrading can occur after the system receives an indication that an iteration of the selecting and the upgrading was completed. These example circuitries and others described herein may include a processor and a non-transitory computer readable medium including instructions executable by the processor to perform the operations described herein. Also, the example aforementioned operations of these circuitries and other circuitries described herein may be performed automatically without human intervention. For example, each step of an upgrading process described herein may occur without human intervention besides the turning on of the electronic device.

In an example, the target version can correspond to a latest version chronologically in the sequence of the versions. Also, the target version can be preset by a user of the electronic device. Also, the target version can be preset by a service provider associated with the component. Also, in such examples, an indication of the target version may be received with the plurality of files.

The system can also include circuitry configured to generate and output a user interface for receiving a user input. In such an instance, the user input can include an indication to proceed with the selecting, the upgrading, and the repeating of the selecting and the upgrading until the component is upgraded to the target version. Circuitry can also be included that receives the user input. After the receiving of the user input, circuitry of the system can also preform the selecting, the upgrading, and the repeating until the component is upgraded to the target version. Also, circuitry of the system can generate and communicate a notification of the upgrade after the component is upgraded to the target version.

In an example, after the component is upgraded to the target version, circuitry of the system can generate and communicate to another electronic device a notification of the upgrade to the target version. The other electronic device can be preset to receive the notification. Also, the other electronic device may be selectable by a user associated with the electronic device.

The system can also include circuitry configured to detect an available upgrade for the component according to a corresponding indication broadcasted by a component upgrade system, wherein the component upgrade system includes one or more computers configured to store the plurality of files and the sequence of the versions. Circuitry can also be included that generates and communicates an upgrade file acquisition request to the component upgrade system. Circuitry can also be included that performs the selecting, the upgrading, and the repeating until the component is upgraded to the target version, wherein the receiving of the plurality of files occurs from a communication of the plurality of files from the component upgrade system, and/or wherein the communication from the component upgrade system is a response to the upgrade file acquisition request.

In an example, the system can also include circuitry to generate and output a user interface for receiving a user input. The user input can include an indication to proceed with the selecting, the upgrading, and the repeating of the selecting and the upgrading until the component is upgraded to the target version. Circuitry can also be included to receive the user input. After the receiving of the user input, circuitry can generate and communicate an upgrade file acquisition request to the component upgrade system. Also, circuitry can be include to perform the selecting, the upgrading, and the repeating until the component is upgraded to the target version, wherein the receiving of the plurality of files occurs from a communication of the plurality of files from the component upgrade system, and/or wherein the communication from the component upgrade system is a response to the upgrade file acquisition request. Also, after the component is upgraded to the target version, circuitry can generate and communicate a notification of the upgrade to the target version.

With respect to the selecting of the file, the system can compare respective file identification numbers of each of the plurality of files with a component version identification number of the component. The file identification numbers and the component version identification number each can include a timestamp or a derivative of a timestamp indicating a last modification of the file or the component, respectively. Also, the system can identify the file as having the file identification number that is most chronologically proximate to the component version identification number, based on the comparison. Also, the selecting of the file may include receiving a preset version upgrade list indicative of the sequence of the versions. The preset version upgrade list can include an order for using the plurality of files to upgrade the component. In such an example, the identifying of the file for the selection can be according to the preset version upgrade list.

It shall be understood that the above description and the detailed description hereinafter are only illustrative and not limiting of the present disclosure.

BRIEF DESCRIPTION OF THE DRAWINGS

The accompanying drawings, which are incorporated in and constitute a part of the specification, illustrate examples consistent with the invention and, together with the description, serve to explain the principles of the present disclosure.

DETAILED DESCRIPTION

Reference will now be made in detail to examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure. Instead, they are merely examples of the systems and methods consistent with some aspects related to the claimed invention.

The terminology used in the present disclosure is for describing examples only and is not intended to limit the present disclosure. As used in the present disclosure and the appended claims, the singular forms "a", "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first", "second", "third", etc. may be used herein to describe various information, the information should not be limited by these terms. These terms are only used to distinguish one category of information from another. For example, without departing from the scope of the present disclosure, first information may be termed as second information; and similarly, second information may be termed as first information. As used herein, the term "if" may be understood to mean "when" or "upon" or "in response to" depending on the context.

Figure 1:
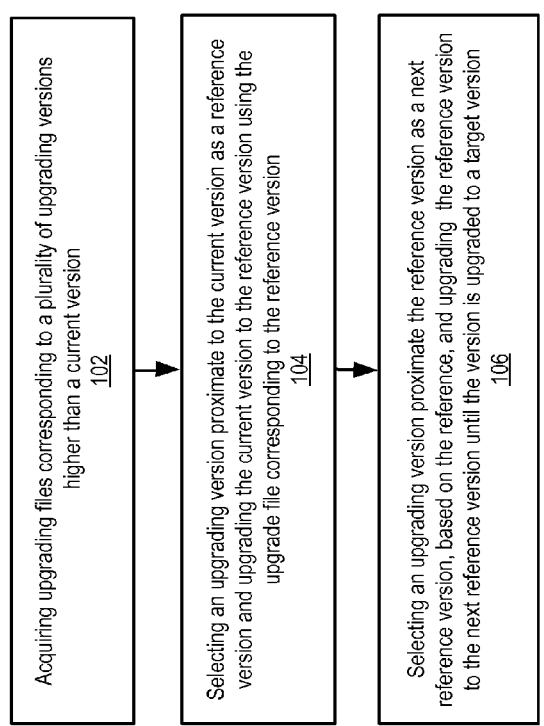
FIG. 1 is a flow chart of an example upgrading method.

FIG. 1 is a flow chart of an example upgrading method. The method may be implemented by a terminal, for example, a router, a mobile phone, or a tablet computer. The upgrading method may improve upgrading efficiency. The upgrading method may include acquiring upgrading files corresponding to a plurality of upgrading versions higher than a current version, at operation 102. In this operation, a terminal may initially access a server, and request to acquire upgrade files corresponding to a plurality of upgrading versions higher than the current version from the server when determining that upgrading is requested and/or available. The server may initially communicate an upgrading message to the terminal, and then the terminal requests to acquire the upgrade files corresponding to the plurality of upgrading versions higher than the current version from the server according to the upgrading message.

For example, in an operating system of a router, where the operating system of the router has four versions and it is assumed that a current version is version one. The versions higher than the current version are respectively version two, version three and version four. Also, the version two is higher than the version one, the version three is higher than the version two, and so on. In such an example, in the operation 102, an upgrade file one-two, an upgrade file two-three and an upgrade file three-four may be acquired, wherein the upgrade file one-two is configured to upgrade the version one to the version two, the upgrade file two-three is configured to upgrade the version two to the version three, and the upgrade file three-four is configured to upgrade the version three to the version four.

In an example, for the receiving of upgrade files corresponding to the plurality of upgrading versions higher than the current version, each upgrade file could be received separately. Alternatively, all the files could be received in a batch communication. For instance, all the upgrade files corresponding to the plurality of upgrading versions higher than the current version may be acquired at the same time by receiving one package.

In operation 104, an upgrading version proximate (such as most proximate) to the current version is selected as a reference version and the current version is upgraded to the reference version by using the upgrade file corresponding to the reference version. During the upgrading, a new version can be a continuation of the previous version. In examples for software or an operating system, the new version can be obtained by upgrading based on a version lower than the new version by one grade. During the upgrading process, if a certain version needs to be upgraded, the version can be upgraded to a version higher than the given version by one grade, and a highest version can be obtained by upgrading the version gradually up to the highest. In other words, the version is not directly upgraded to the highest version without undergoing a plurality of intermediate versions between the current version and the highest version.

Herein, one upgrading version proximate to the current version refers to a version next to the current version (or the next version). For a plurality of versions using a version number as an identification, a proximal upgrading version refers to a version having a version number next to the version number of the current version. For example, given that the version number of the current version is labeled v1.1, then in the versions respectively labeled v1.2, v1.3 and v1.4, the version labeled to v1.2 shall be determined as the proximal upgrading version.

For a plurality of versions using file generating time or a derivative thereof as an identification, the proximal upgrading version refers to a version corresponding to the generating time having a shortest interval after the generating time of the current version. For example, given the version generating time of the current version is 20130303, then in the versions respectively corresponding to the version generating time 20130504, the version generating time 20130607 and the version generating time 20130910, the version corresponding to the version generating time 20130504 is considered as the proximal upgrading version.

Using the operating system of the router for example, if it is requested to upgrade the version one to the version four, since the version two and the version three exist between the version one and the version four, the version one can be upgraded step by step to the version four by using the version two and the version three during upgrading. For instance, the version one is firstly upgraded to the version two, then the version two is upgraded to the version three, and finally the version three is upgraded to the version four. In an example, the version two is selected as the upgrading version proximate the version one, the version two is used as the reference version, and then the version one is upgraded to the version two by using the upgrade file one-two corresponding to the version two, and so on.

In operation 106, based on the reference version, an upgrading version proximate the reference version is selected as a next reference version, and the reference version is upgraded to the next reference version until the version is upgraded to a target version. The target version can be the highest version in the plurality of upgrading versions. Using the operating system of the router for example, the version three is higher than the version two by a grade, the version four is higher than the version two by two grades, and the version four is higher than the version three by a grade. After the version two is upgraded, the version two can be upgraded to the version three that is higher than the version two by a grade. The version three is higher than the version two by a grade is selected as the next reference version and the upgrade file two-three is used to upgrade the version two to the next reference version, which is the version three. When the version three is upgraded, the version four being higher than the version three by a grade is selected, and the upgrade file three-four is used to upgrade the version three to the version four, and in a step-by-step process, the upgrade from the version one to the version four is made. In the step-by-step process of updating from version one to the version four for example, the updates can be made automatically without user validation or even any user interaction.

Such operations may include generating an upgrade starting user interface, such as after receiving the upgrade files corresponding to the plurality of upgrading versions higher than the current version. Through the upgrade starting user interface, a user may select to upgrade immediately or select a time to upgrade. For example, the upgrading process uses memory resources, so the user may select to upgrade the terminal when fewer of the memory resources of the terminal are being used.

In an example, between operations 102 and 104, the method may include generating an upgrade starting user interface according to the acquired upgrade files corresponding to the plurality of upgrading versions. In such an example, whether receiving an upgrade operation inputted according to the upgrade starting user interface is determined. When the upgrade operation is received, operation 104 is performed.

Figure 2:
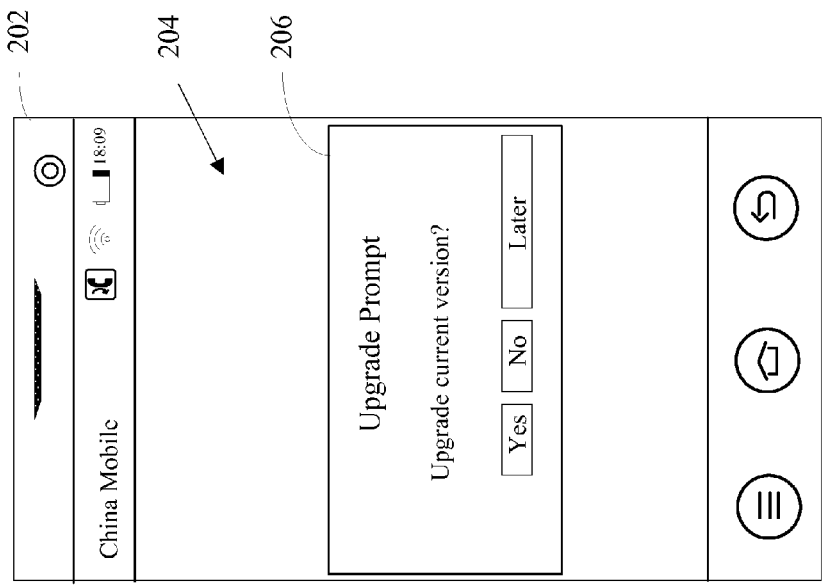
FIG. 2 is a front perspective of an example electronic device providing a user interface to receive a user input to initiate an upgrading method.

FIG. 2 illustrates a terminal 202 and a display interface 204, wherein an upgrade starting user interface is displayed to a user in a pop-up box 206 on the display interface 204. In an example, for facilitating the operation of the user, as illustrated in FIG. 2, such operation controls as "Yes", "No", and "Later" may also be added in the pop-up box 206, so that the user may quickly input corresponding operations according to the upgrade starting user interface. In an example, the user may select to upgrade immediately or upgrade at a later time. For example, the user may select to start upgrading the terminal when fewer of the memory resources of the terminal are being used. In an example, the pop-up box 206 may include a version name of each upgrading version higher than the current version. Where a user does not select an upgrading version in the pop-up box 206, the terminal may (such as by default) select the highest version. If the user performs an operation of selecting an upgrading version in the pop-up box 206, then the terminal receives the selection, acquires the version selected by the user in the operation, and designates the selected version as the target version.

In an example, after operation 106, the method may include determining whether the most recent upgrade is an upgrade to the target version. The target version may be the highest version stored in a server. In such an example, it is determined whether the version identity of the upgraded version and the version identity of the highest version is same the version. If the two version identities are the same, then it is determined that the version has been upgraded to the target version. If the two version identities are different, then it is determined that the version has not been upgraded to the target version.

In an example, the target version may be a version higher than the current version and lower than the highest version, and such a target version may be selected by the user in the pop-up box 206. Such as in the example of the operating system of the above router, a user may request to upgrade the version one to the version three rather than the version four due to such issues as limited network bandwidth. In such an instance, the user may perform the operation of selecting the version three in the pop-up box 206. The terminal then may receive the operation of the user and acquire the version three. Also, the terminal may designate the version three as the target version.

In an example, when the version is upgraded to the target version, an upgrade success user interface can be generated. In such an example, the upgrade success user interface can be displayed. The displaying of the upgrade success user interface may include displaying the upgrade success user interface in a local display. It may also include communicating the upgrade success user interface to a preset mobile terminal (such as one that is not local). Also, the pop-up box (as illustrated in FIG. 2) may be adapted for displaying the upgrade success user interface in the local display or a remote display.

In an example, if the terminal has already been equipped with a display, such as is the case with a smart phone or a tablet, then the upgrade success user interface may be directly displayed in the local display. If the terminal is not equipped with a display, for example, such as a router, then the upgrade success user interface may be communicated to a preset terminal equipped with a display.

Figure 3:
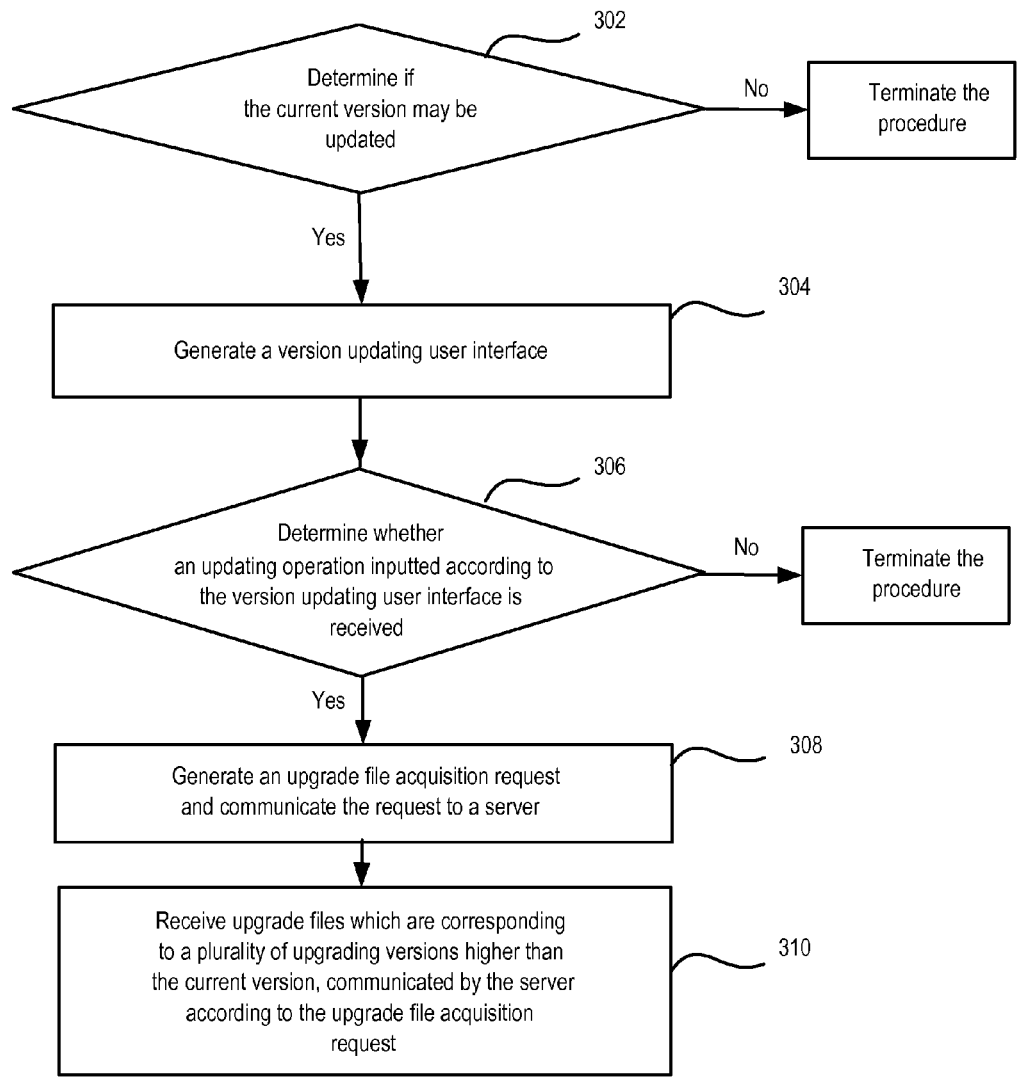
FIG. 3 is a flow chart of an example upgrading method based on the example method illustrated in FIG. 1.

FIG. 3 illustrates example sub-operations for the operation 102. In operation 302, it is determined whether the current version may be upgraded. If an upgrade is available, operation 304 is performed (which is generating a version updating user interface); otherwise the procedure ends. A terminal can communicate a detection request to a server, wherein the detection request carries a version identity of the current version, and the version identity may be either a version number or a version generating time. The server can receive the detection request, extract the version identity of the current version from the detection request, and compare the version identity of the current version with the version identity of a highest version locally stored in the server. If the version number of the highest version is larger than the version number of the current version, or the version generating time of the highest version is later than the version generating time of the current version, then it is determined that the current version is requested and/or available for upgrading. Thus, first instruction information is generated and communicated to the terminal, the first instruction information being configured to instruct the terminal that the current version is requested and/or available for upgrading. If the version number of the highest version is smaller than or equal to the version number of the current version, or the version generating time of the highest version is earlier than or equal to the version generating time of the current version, then it is determined that the current version is not requested and/or available for upgrading. Thus, second instruction information is generated and communicated to the terminal. The second instruction information is configured to instruct the terminal that the current version is not requested and/or available for upgrading. The terminal receives the instruction information communicated by the server. If the instruction information is the first instruction information, then it is determined that the current version is requested and/or available for upgrading. If the instruction information is the second instruction information, then it is determined that the current version is not requested and/or available for upgrading, and the upgrading operations are inactivated.

In an example, the version one is labeled V1.1 and the version generating time is labeled 20130303; the version number of the version two is labeled V1.2 and the version generating time is labeled 20130504; the version number of the version three is labeled V1.3 and the version generating time is labeled 20130607; and the version number of the version four is labeled V1.4 and the version generating time is labeled 20130910. The terminal communicates a detection request to the server, the detection request carrying a version identity of the version one. For example, the version identity refers to the version number (e.g., the version identity of the version one is the version number V1.1). The server receives the detection request. Then it extracts the version number V1.1 of the version one from the detection request and acquires the version number V1.4 of the version four (the highest version stored locally). Finally, it compares the version number V1.1 of the version one with the version number V1.4 of the version four. Where the version number V1.1 of the version one is smaller than the version number V1.4 of the version four, then it is determined that the version one is requested and/or available for upgrading, and first instruction information is generated and communicated to the terminal. The first instruction information can be configured to instruct the terminal that the version one is requested and/or available for upgrading.

In an example, the version identity can refer to the version generating time (e.g., the version identity of the version one is the version generating time 20130303). The server receives the detection request, extracts the version generating time 20130303 of the version one from the detection request, acquires the version generating time 20130910 of the version four (the highest version stored locally), and compares the version generating time 20130303 of the version one with the version generating time 20130910 of the version four. Where the version generating time 20130303 of the version one is earlier than the version generating time 20130910 of the version four, then it is determined that the version one is requested and/or available for upgrading. First instruction information is then generated and communicated to the terminal. The first instruction information being configured to instruct the terminal that the version one is requested and/or available for upgrading. Then, the terminal receives the first instruction information communicated by the server, and determines that the version one is requested and/or available for upgrading.

In operation 304, a version upgrading user interface is generated. When the current version is requested and/or available for upgrading, a version upgrading user interface as illustrated in FIG. 2 may be generated, and the version upgrading user interface may be displayed in the local display of a terminal. Also, the version upgrading user interface can be communicated to a preset mobile terminal. The preset mobile terminal receives the version upgrading user interface and displays the version upgrading user interface in the local display of the preset mobile terminal.

In operation 306, the system can determine whether an upgrade operation inputted according to the version upgrading user interface is received. If the upgrade operation is received, then operation 308 is performed (which is generation of the file acquisition request and communication of the request to the server). If the upgrade operation is not received, then the procedure ends.

For example, the user may select the "Yes" button in the version upgrading user interface as illustrated in FIG. 2 to input the upgrade operation. Subsequently, at operation 308, an upgrade file acquisition request is generated and communicated to the server. When the terminal receives the upgrade operation, an acquisition request for receiving the upgrade files corresponding to the plurality of upgrading versions higher than the current version is generated and communicated to the server. The acquisition request can include a version identity of the current version. The server can receive the acquisition request and extract the version identity of the current version from the acquisition request. Then it can acquire the version identities of the plurality of upgrading versions higher than the current version locally and acquire the upgrade files corresponding to the plurality of upgrading versions higher than the current version according to the version identity of the current version and the version identities of the plurality of upgrading versions higher than the current version. Finally, the server communicates the acquired upgrade files to the terminal.

Using the operating system of the router as an example, the terminal generates an acquisition request for receiving the upgrade files of the plurality of upgrading versions higher than the version one and communicates the acquisition request to the server. The acquisition request includes a version identity of the version one. The server receives the acquisition request, extracts the version identity of the version one from the acquisition request, and acquires the version identities of the upgrading versions higher than the version one (e.g., the version two, the version three, and the version four). The upgrade file one-two for upgrading the version one to the version two, the upgrade file two-three for upgrading the version two to the version three, and the upgrade file three-four for upgrading the version three to the version four are acquired according to the version identity of the version one, the version identity of the version two, the version identity of the version three and the version identity of the version four. Also, the upgrade file one-two, the upgrade file two-three, and the upgrade file three-four can be communicated to the terminal.

In operation 310, the upgrade files are received. The upgrade files are the files corresponding to the plurality of upgrading versions higher than the current version and are communicated by the server according to the upgrade file acquisition request. For example, the terminal receives the upgrade file one-two, the upgrade file two-three, and the upgrade file three-four communicated by the server.

In an example, the upgrade files corresponding to the plurality of upgrading versions higher than the current version can be acquired whenever it is detected that the current version is requested and/or available for upgrading, and upgrading is performed according to the acquired upgrade files. For instance, as long as an upgrading version is higher than the current version, the corresponding upgrade files thereof can be acquired, and the current version can be upgraded to the highest version according to the upgrade files. Thus, the version may be ensured to be the highest version.

The operation 104 illustrated in FIG. 1 may be implemented several different ways. For example, a version identity of the current version and a version identity of each of the upgrading versions can be acquired. The version identity can be a version number and/or a version generating time. For example, given the version number of the version one is labeled V1.1 and the version generating time is labeled 20130303; the version number of the version two is labeled V1.2 and the version generating time is labeled 20130504; the version number of the version three is labeled V1.3 and the version generating time is labeled 20130607; and the version number of the version four is labeled V1.4 and the version generating time is labeled 20130910. Also, the version identity of the current version is compared with the version identity of each of the upgrading versions. For example, if the version identity is the version generating time, then the version generating time 20130303 of the version one is respectively compared with the generating time 20130504 of the version two, the generating time 20130607 of the version three and the generating time 20130910 of the version four. It may be determined that the time interval between the version generating time 20130303 of the version one and the version generating time 20130504 of the version two is the shortest. Also, an upgrading version having a version identity adjacent to and higher than the version identity of the current version is determined as the reference version. For example, since the time interval between the version generating time 20130303 of the version one and the version generating time 20130504 of the version two is the shortest, then the version two is determined as the reference version.

In another example of implementing operation 104, a preset version upgrade list is acquired from the upgrade file. The upgrade file may include the preset version upgrade list, and the preset version upgrade list may include an upgrade sequence of the plurality of upgrading versions. For example, see Table 1.

TABLE 1

| Version Name | Version Sequence |
|---|---|
| Version two | 1 |
| Version three | 2 |
| Version four | 3 |

The upgrading version next to the current version in an upgrade sequence from low to high is determined as the reference version according to the preset version upgrade list. For example, the upgrading version (e.g., the version two) next to the current version (e.g., the version one) is determined as the reference version.

In such an example, acquiring the version identity of some of the upgrading versions can be bypassed. Also, determining the upgrade sequence according to the version identities of the upgrading versions can be bypassed. Instead, the upgrade sequence can be directly determined according to the preset version upgrade list, so that the upgrading operation is simplified.

Also with respect to FIG. 1, the operation 106 may be implemented in several ways. For example, it may be determined whether the reference version is being upgraded. Using the operating system of the router as an example, the detecting whether the reference version is upgraded at operation 106 may include detecting whether the version two is upgraded. When the reference version is upgraded, the current version is controlled to restart and enter the reference version. When the version two is upgraded, the version one may be controlled to restart, so that the router runs the operating system of the version two. Whether the restarting is completed is determined. When the restarting is completed, an upgrading version proximate the reference version is selected as a next reference version. For example, when the restarting is completed, an upgrading version (e.g., the version three) proximate the reference version (e.g., the version two) is selected as the next reference version.

In another example for implementing operation 106, the system may determine whether an upgrading version higher than the next reference version exists in the plurality of upgrading versions. If it is higher, then the version is upgraded in sequence to the upgrading versions higher than the next reference version. Otherwise, the next reference version is determined as the target version and the upgrade is ended. Using the example of the operating system of the router, the reference version (e.g., the version two) is upgraded to the next reference version (e.g., the version three). It may also be determined (such as by the preset version upgrade list) that an upgrading version (e.g., the version four) higher than the next reference version (e.g., the version three) also exists. If this is the case, then the selecting of the upgrading version proximate to the current version as a reference version and upgrading the current version to the reference version using the upgrade file corresponding to the reference version occurs at operation 104. In this example, the next reference version (e.g., the version three) is upgraded to the upgrading version (e.g., the version four). This procedure can be repeated until, it is determined that the target version has been reached. For example, the version four can be determined as the target version and the upgrade is ended.

Figure 4:
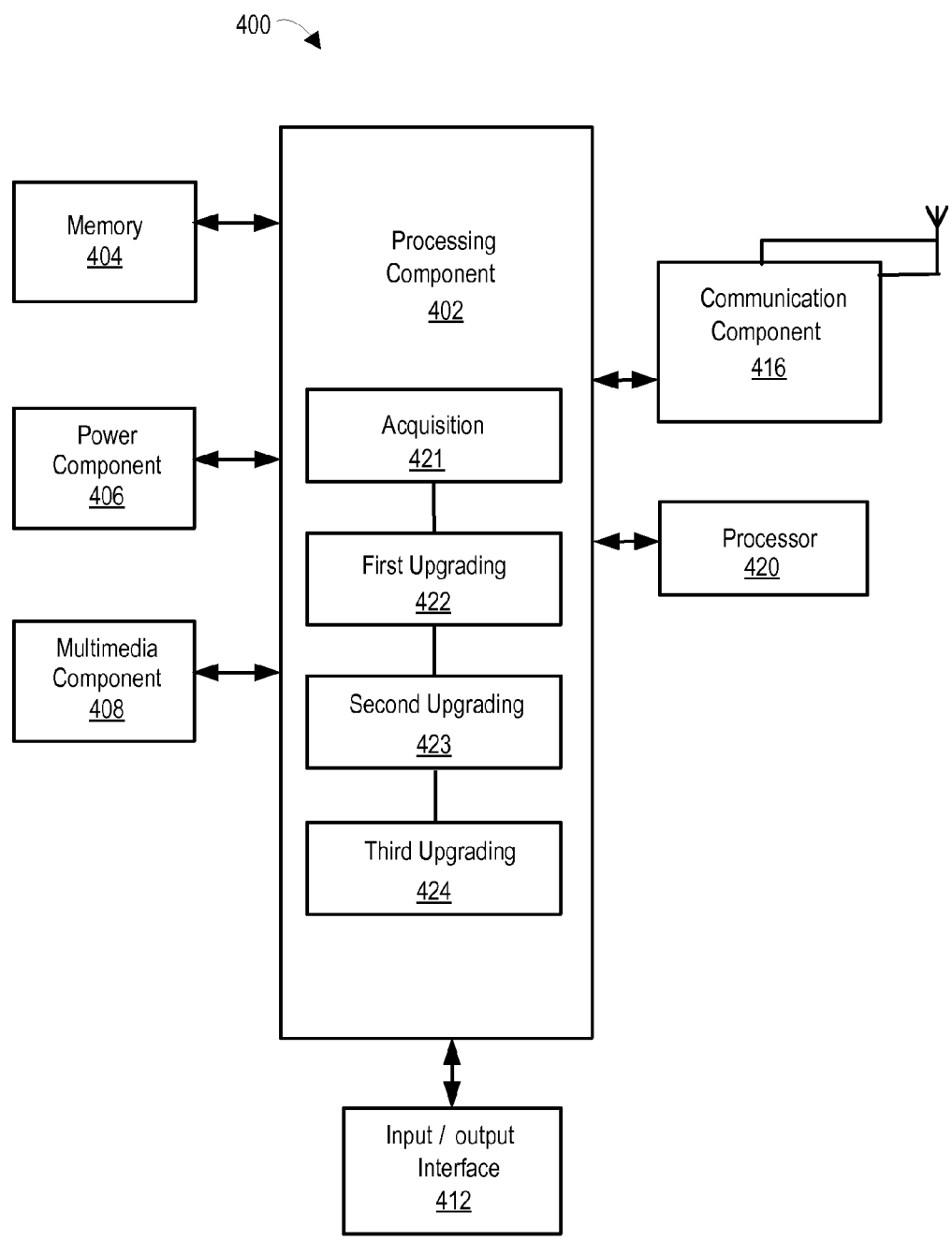
FIG. 4 is a block diagram of an example upgrading system, such as an upgrading system of an electronic device, configured to perform upgrading operations such as those described herein.

FIG. 4 is a block diagram of an example upgrading system within an electronic device 400. The upgrading system can be configured to perform upgrading operations, such as those illustrated in FIGS. 1-3.

The device 400 may be a smart device, mobile phone, personal computer, modem, router, or any other type of electronic device capable of receiving communications over a network and upgrading according to at least such communications. The device 400 may also be a digital broadcast terminal, a messaging apparatus, a gaming console, a tablet, a medical apparatus, an exercise device, or a personal digital assistant. The device 400 includes, at least, a processing component 402, memory 404, a power component 406, an input/output (I/O) interface 412, a communication component 416, and a processor 420. The device 400 may also include a multimedia component 408 and other types of components common to an electronic device capable of receiving communications over a network and upgrading according to at least such communications.

The processing component 402 can control overall operations of the device 400, such as the operations associated with displaying information, data communications, and recording operations. The processing component 402 may include or be closely coupled to the processor 420 so to execute instructions to perform all or part of the operations of the methods described herein. Also, the processing component 402 may include such instructions in the form of software and/or hardware. For example, the processing component 402 may include any of the circuitries described herein (which may be self-executable or executable by the processor 420).

The memory 404 is configured to store various types of data to support the operations and circuitries of the device 400. Examples of such data include instructions for any applications or methods operated on the device 400. The memory 404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the device 400. The power component 406 may include a power management system, one or more power sources, and any other components associated with the generation, management, and distribution of power in the device 400.

The multimedia component 408 may include a screen providing an output interface between the device 400 and the user. In some examples, the screen may include a liquid crystal display (LCD) and a touch panel (TP). The multimedia component 408 may also include an audio component and/or a voice input component.

The I/O interface 412 may provide an interface between the processing component 402 and peripheral interface modules, such as a keyboard, a click wheel, buttons, and the like. The buttons may include, but are not limited to, a home button, a volume button, a starting button, and a locking button.

The communication component 416 is configured to facilitate communication, wired or wirelessly, between the device 400 and other device. The device 400 can access a wireless network based on a communication standard, such as WiFi, 2G, or 3G, or a combination thereof. In an example, the communication component 416 can receive a broadcast signal from an external broadcast management system via a broadcast channel. In an example, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an example, the device 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In an example, the device may include a non-transitory computer readable storage medium including instructions, such as included in the memory 404, executable by the processor 420, for performing the operations described herein. For example, the non-transitory computer-readable storage medium may include a ROM, a RAM, a CD-ROM, a magnetic tape, a floppy disc, or an optical data storage apparatus.

Referring back to the processing component 402, the processing component may include circuitries configured to execute many of the operations described herein. Such circuitries may include an acquisition unit 421, a first upgrading unit 422, a second upgrading unit 423 and a third upgrading unit 424. The acquisition unit 421 may be configured to acquire upgrade files corresponding to a plurality of upgrading versions higher than a current version. The first upgrading unit 422 may be configured to select an upgrading version proximate the current version as a reference version and upgrade the current version to the reference version by using the upgrade file corresponding to the reference version. The second upgrading unit 423 may be configured to, based on the reference version, select an upgrading version proximate the reference version as a next reference version. The third upgrading unit 424 may be configured to upgrade the reference version to the next reference version until the version is upgraded to a target version (for example, the target version being the highest version in the plurality of upgrading versions).

In an example, with the circuitries 421-424, the upgrade files corresponding to the plurality of upgrading versions higher than the current version are acquired. Also, an upgrading version proximate the current version is selected as a reference version, and the upgrade file corresponding to the reference version is used to upgrade the current version to the reference version. Also, based on the reference version, an upgrading version proximate the reference version is selected as a next reference version, and the reference version is upgraded to the next reference version until the reference version is upgraded to the target version. For example, when a plurality of upgrading versions higher than the current version exist, the upgrade files corresponding to the plurality of upgrading versions higher than the current version are directly acquired, and the current version is upgraded to the target version step by step according to the acquired upgrade files without user validation.

In an example, the device 400 may include a first generation unit, a determination unit and a fourth upgrading unit. The first generation unit can be configured to generate an upgrade starting user interface according to the acquired upgrade files corresponding to the plurality of upgrading versions. The determination unit can be configured to determine whether an upgrade operation inputted according to the upgrade starting user interface is received. The fourth upgrading unit can be configured to, when the upgrade operation is received, perform the operation of selecting an upgrading version proximate the current version as the reference version, and upgrade the current version to the reference version by using the upgrade file corresponding to the reference version.

In an example, the device may include a second generation unit and a display unit. The second generation unit may be configured to, when the current version is upgraded to the target version, generate an upgrade success user interface. The display unit may be configured to display the upgrade success user interface.

In an example, the display unit may include a first display subunit and a second display subunit. The first display subunit can be configured to display the upgrade success user interface in a local display. The second display subunit can be configured to communicate the upgrade success user interface to a preset mobile terminal, so that the upgrade success user interface is displayed on the preset mobile terminal.

In an example, the acquisition unit 421 may include a first detection subunit, a first generation subunit, a first determination subunit, a second generation subunit, a communication subunit and a receiving subunit. The first detection subunit may be configured to detect whether the current version is requested and/or available for upgrading. The first generation subunit may be configured to, when the current version is requested and/or available for upgrading, generate a version upgrading user interface. The first determination subunit may be configured to determine whether an upgrade operation inputted according to the version upgrading user interface is received. The second generation subunit may be configured to, when the upgrade operation is received, generate an upgrade file acquisition request. The communication subunit may be configured to communicate the upgrade file acquisition request to a server. The receiving subunit may be configured to: receive the upgrade files that correspond to the plurality of upgrading versions higher than the current version; and communicate, with the server, according to the upgrade file acquisition request.

In an example, the first upgrading unit 422 includes a first acquisition subunit, a comparison subunit, and a first determination subunit. The first acquisition subunit may be configured to acquire a version identity of the current version and a version identity of each of the upgrading versions, the version identity including a version number and/or a version generating time. The comparison subunit may be configured to compare the version identity of the current version with the version identity of each of the upgrading versions. The first determination subunit may be configured to determine an upgrading version having a version identity adjacent to and higher than the version identity of the current version as the reference version.

In an example, the first upgrading unit 422 includes a second acquisition subunit and a second determination subunit. The second acquisition subunit may be configured to acquire a preset version upgrade list from the upgrade file. The upgrade file may include the preset version upgrade list, and the preset version upgrade list may include an upgrade sequence of the plurality of upgrading versions. The second determination subunit may be configured to determine the upgrading version next to the current version in an upgrade sequence from low to high as the reference version according to the preset version upgrade list.

In an example, the second upgrading unit 423 may include a second detection subunit, a control subunit, a third detection subunit and a selection subunit. The second detection subunit may be configured to detect whether the reference version is upgraded. The control subunit may be configured to: when the reference version is upgraded, control restart of the current version; and enter the reference version. The third detection subunit may be configured to detect whether the restarting is completed. The selection subunit may be configured to, when the restarting is completed, select an upgrading version proximate the reference version as a next reference version.

In an example, the third upgrading unit 24 includes a second determination subunit, an upgrading subunit, and a third determination subunit. The second determination subunit may be configured to determine whether an upgrading version higher than the next reference version exists in the plurality of upgrading versions. The upgrading subunit may be configured to, when the upgrading version higher than the next reference version exists in the plurality of upgrading versions, upgrade the version in sequence to the upgrading version higher than the next reference version. The upgrading subunit may also perform the operation of determining whether the upgrading version higher than the next reference version exists in the plurality of upgrading versions. The third determination subunit may be configured to, when no upgrading version higher than the next reference version exists in the plurality of upgrading versions, determine the next reference version as the target version, and then terminate the upgrade.

Other embodiments of the present disclosure will be apparent to those skilled in the art from consideration of the specification. This application is intended to cover any variations, uses, or adaptations of the present disclosure following the general principles thereof and including such departures from the present disclosure as coming within common knowledge or customary technical means in the art. It is intended that the specification and embodiments be considered as examples only.

It will be appreciated that the present disclosure is not limited to the exact construction that has been described above and illustrated in the accompanying drawings, and that various modifications and changes can be made without departing from the scope thereof. It is intended that the scope of the invention should only be limited by the appended claims.

We claim:

1. A method of proximity upgrade of components on an electronic device, comprising:
   detecting automatically, without human intervention, an available upgrade for a component of the electronic device according to a corresponding indication broadcasted by a component upgrade system;
   based on the detection of the available upgrade, generating a version upgrading user interface;
   based on generating the version upgrading user interface, determining whether an upgrade operation input according to the version upgrading user interface has been received;
   in response to determining that the upgrade operation input has not been received, terminating execution;
   in response to determining the upgrade operation input has been received, generating and communicating an acquisition request to a server, wherein the acquisition request includes a first version identity of a current version;

in instances when there exists a plurality of upgrade versions higher than the version identity of the current version, receiving, at the electronic device, a plurality of files for upgrading the component of the electronic device and a preset version upgrade list within the plurality of files, the preset version upgrade list indicating a sequence of versions and including an order for using the plurality of received files to upgrade the component;

selecting, by the electronic device, a file of the plurality of files based on the preset version upgrade list received within the plurality of files, wherein the selected file is indicative of being configured to upgrade the component to a next version of a chronological sequence of versions of the component;

upgrading the component using the selected file of the plurality of files; and repeating automatically, without human intervention, the selecting of a file of the plurality of files and the upgrading the component to a next version of the sequence of versions of the component according to the preset version upgrade list until the component is upgraded to a target version of the sequence of the versions.

2. The method of claim 1, wherein the component includes a software component of the electronic device.

3. The method of claim 1, wherein the component includes a firmware component of the electronic device.

4. The method of claim 1, wherein the component includes a hardware component of the electronic device.

5. The method of claim 1, wherein the target version corresponds to a latest version chronologically in the sequence of the versions.

6. The method of claim 1, wherein the target version is preset by a user of the electronic device.

7. The method of claim 1, wherein the target version is preset by a service provider associated with the component.

8. The method of claim 1, wherein the target version is preset, and wherein an indication of the target version is received with the plurality of files.

9. The method of claim 1, further comprising:
generating and outputting a user interface for receiving a user input, wherein the user input includes an indication to proceed with the selecting, the upgrading, and the repeating of the selecting and the upgrading until the component is upgraded to the target version;
receiving the user input;
after the receiving of the user input, performing the selecting, the upgrading, and the repeating until the component is upgraded to the target version; and
after the component is upgraded to the target version, generating and communicating a notification of the upgrade to the target version.

10. The method of claim 1, further comprising:
after the component is upgraded to the target version, generating and communicating to another electronic device a notification of the upgrade to the target version, wherein the other electronic device is preset to receive the notification.

11. The method of claim 10, wherein the other electronic device is selectable by a user associated with the electronic device.

12. The method of claim 1, further comprising:
generating and communicating automatically, without human intervention, an upgrade file acquisition request to the component upgrade system; and
performing the selecting, the upgrading, and the repeating automatically, without human intervention, until the component is upgraded to the target version, wherein the receiving of the plurality of files occurs from a communication of the plurality of files from the component upgrade system, and wherein the communication from the component upgrade system is a response to the upgrade file acquisition request.

13. The method of claim 1, further comprising:
generating and outputting a user interface for receiving a user input, wherein the user input includes an indication to proceed with the selecting, the upgrading, and the repeating of the selecting and the upgrading until the component is upgraded to the target version;
receiving the user input;
after the receiving of the user input:
performing the selecting, the upgrading, and the repeating until the component is upgraded to the target version, wherein the receiving of the plurality of files occurs from a communication of the plurality of files from the component upgrade system, and wherein the communication from the component upgrade system is a response to the upgrade file acquisition request; and
after the component is upgraded to the target version, generating and communicating a notification of the upgrade to the target version.

14. The method of claim 1, wherein the selecting of the file, comprises:
comparing respective file identification numbers of each of the plurality of files with a component version identification number of the component, wherein the file identification numbers and the component version identification number each include a timestamp or a derivative of a timestamp indicating a last modification of the file or the component respectively; and
identifying the file as having the file identification number that is most chronologically proximate to the component version identification number, based on the comparison.

15. The method of claim 1, wherein the repeating of the selecting and the upgrading occurs after the electronic device receives an indication that an iteration of the selecting and the upgrading was completed.

16. An electronic device for proximity upgrade of upgradable circuits, comprising:
an automatically upgradable circuit;
communication circuitry; and
data processing circuitry, configured to:
receive, via the communication circuitry, a plurality of files for upgrading the upgradable circuit and a preset version upgrade list within the plurality of files, the preset version upgrade list indicating a sequence of versions and including an order for using the plurality of received files to upgrade the upgradable circuit;
detect, via the communication circuitry, an available upgrade for the upgradable circuit according to a corresponding indication broadcasted by a component upgrade system, wherein the component upgrade system includes one or more storage devices configured to store the plurality of files;
based on the detection of the available upgrade, generate a version upgrading user interface;

based on the generation of the version upgrading user interface, determine whether an upgrade operation input according to the version upgrading user interface has been received;

in response to a determination that the upgrade operation input has not been received, terminate execution;

in response to a determination that the upgrade operation input has been received, generate and communicate, using the communication circuitry, an upgrade file acquisition request to the component upgrade system, wherein the upgrade file acquisition request includes a first version identity of a current version;

in instances when there exists a plurality of upgrade versions higher than the version identity of the current version, select a file of the plurality of files based on the preset version upgrade list received within the plurality of files, wherein the selected file is indicative of being configured to upgrade the circuit to a next version of a chronological sequence of versions of the circuit, and the receiving of the plurality of files and the preset version upgrade list occurs from a communication of the plurality of files from the component upgrade system, and wherein the communication from the component upgrade system is a response to the upgrade file acquisition request;

upgrade the circuit using the selected file; and repeat automatically, without human intervention, the selecting of a file of the plurality of files and the upgrading to a next version of the sequence of versions of the upgradable circuit according to the preset version upgrade list until the circuit is upgraded to a target version of the sequence of the versions.

17. The electronic device of claim 16, wherein the data processing circuitry is further configured to generate and communicate, via the communication circuitry, a notification of the upgrade to another electronic device after the circuit is upgraded to the target version, wherein the other electronic device is preset to receive the notification, and wherein the other electronic device is selectable by a user associated with the electronic device.

18. A non-transitory computer readable storage medium having stored thereon, executable instructions for proximity upgrade of upgradable circuits, the executable instructions comprising:

instructions executable by a processor to receive, via communication circuitry, a plurality of files for upgrading an upgradable circuit and a preset version upgrade list within the plurality of files, the preset version upgrade list indicating a sequence of versions and including an order for using the plurality of received files to upgrade the upgradable circuit;

instructions executable by a processor to detect, via the communication circuitry, an available upgrade for the upgradable circuit according to a corresponding indication broadcasted by a component upgrade system, wherein the component upgrade system includes one or more storage devices configured to store the plurality of files;

instructions executable by a processor to, based on the detection of the available upgrade, generate a version upgrading user interface;

instructions executable by a processor to, based on the generation of the version upgrading user interface, determine whether an upgrade operation input according to the version upgrading user interface has been received;

instructions executable by a processor to, in response to a determination that the upgrade operation input has not been received, terminate execution;

instructions executable by a processor to, in response to a determination that the upgrade operation input has been received, generate and communicate, via the communication circuitry, an upgrade file acquisition request to the component upgrade system, wherein the upgrade file acquisition request includes a first version identity of a current version;

instructions executable by a processor to in instances when there exists a plurality of upgrade versions higher than the version identity of the current version, select a file of the plurality of files based on the preset version upgrade list received within the plurality of files, wherein the selected file is indicative of being configured to upgrade the circuit to a next version of a chronological sequence of versions of the circuit, wherein the receiving of the plurality of files occurs from a communication of the plurality of files from the component upgrade system, and wherein the communication from the component upgrade system is a response to the upgrade file acquisition request;

instructions executable by a processor to upgrade the circuit using the selected file; and instructions executable by a processor to repeat automatically, without human intervention, the selecting of a file of the plurality of files and the upgrading to a next version of the sequence of versions of the upgradable circuit according to the preset version upgrade list until the circuit is upgraded to a target version of the sequence of the versions.

19. The non-transitory computer readable storage medium of claim 18, wherein the instructions executable by a processor to select the file, comprise:

instructions executable to compare respective file identification numbers of each of the plurality of files with a component version identification number of the component, wherein the file identification numbers and the component version identification number each include a timestamp or a derivative of a timestamp indicating a last modification of the file or the component respectively; and instructions executable to identify the file as having the file identification number that is most chronologically proximate to the component version identification number, based on the comparison.

* * * * *